(12) United States Patent
Molter et al.

(10) Patent No.: US 11,471,829 B2
(45) Date of Patent: Oct. 18, 2022

(54) ELECTROCHEMICAL CARBON DIOXIDE RECOVERY SYSTEM

(71) Applicant: Skyre, Inc., East Hartford, CT (US)

(72) Inventors: Trent M. Molter, Glastonbury, CT (US); Karen Murdoch, Somers, CT (US); Christopher Ellithorpe, Suffield, CT (US); Timothy Myles, Manchester, CT (US); Robert Roy, West Springfield, MA (US)

(73) Assignee: SKYRE, INC., East Hartford, CT (US)

( * ) Notice: Subject to any disclaimer, the term of this patent is extended or adjusted under 35 U.S.C. 154(b) by 405 days.

(21) Appl. No.: 16/741,148

(22) Filed: Jan. 13, 2020

(65) Prior Publication Data

US 2020/0222852 A1    Jul. 16, 2020

Related U.S. Application Data

(60) Provisional application No. 62/792,330, filed on Jan. 14, 2019.

(51) Int. Cl.
*B01D 53/32* (2006.01)
*B01D 53/75* (2006.01)
*B01D 53/78* (2006.01)

(52) U.S. Cl.
CPC ......... *B01D 53/78* (2013.01); *B01D 53/326* (2013.01); *B01D 53/75* (2013.01); *B01D 2251/604* (2013.01); *B01D 2251/606* (2013.01); *B01D 2257/504* (2013.01)

(58) Field of Classification Search
CPC ............. B01D 53/78; B01D 2251/606; B01D 53/326; B01D 53/75; B01D 53/965; B01D 53/62; B01D 2251/604; B01D 2257/504; Y02C 20/40; B01J 19/087; B01J 2219/0805; B01J 2219/0809; B01J 2219/0877
See application file for complete search history.

(56) References Cited

U.S. PATENT DOCUMENTS

| | | | | |
|---|---|---|---|---|
| 3,344,050 A | * | 9/1967 | Mayland | B01D 53/62 |
| | | | | 423/232 |
| 5,141,620 A | * | 8/1992 | Molter | H01M 8/0662 |
| | | | | 204/263 |
| 11,219,860 B1 | * | 1/2022 | Jakobsen | C02F 1/46104 |
| 2010/0230293 A1 | * | 9/2010 | Gilliam | C01F 11/18 |
| | | | | 205/555 |
| 2019/0240621 A1 | * | 8/2019 | Torres | C25B 9/73 |

FOREIGN PATENT DOCUMENTS

| | | | | |
|---|---|---|---|---|
| CA | 2 833 889 A1 | * | 5/2014 | ............ C25B 3/25 |
| RU | 2 654 755 C1 | * | 5/2018 | ............ B01D 53/62 |
| WO | WO 2021 177 823 A1 | * | 9/2021 | ............ B01D 61/48 |

* cited by examiner

*Primary Examiner* — Timothy C Vanoy
(74) *Attorney, Agent, or Firm* — Cantor Colburn LLP

(57) ABSTRACT

In an embodiment, a method for recovering carbon dioxide comprises introducing a carbon dioxide rich stream to a scrubber comprising a metal hydroxide and allowing the carbon dioxide to react with the metal hydroxide to form a metal carbonate; directing a metal carbonate stream from the scrubber to an electrochemical concentrator and applying a potential to the electrochemical concentrator to form a metal hydroxide stream and a separated carbon dioxide stream; directing the metal hydroxide stream comprising a recovered metal hydroxide and hydrogen to an electrochemical separator and applying a potential to the electrochemical separator to separate the hydrogen forming a hydrogen recycle stream from the recovered metal hydroxide forming a metal hydroxide recycle stream; and directing the separated carbon dioxide stream to a gas liquid separator and separating the separated carbon dioxide stream into a recycled water stream and a concentrated carbon dioxide stream.

14 Claims, 2 Drawing Sheets

ELECTROCHEMICAL CARBON DIOXIDE RECOVERY SYSTEM

CROSS-REFERENCE TO RELATED APPLICATION

This application claims the benefit of U.S. Provisional Patent Application Ser. No. 62/792,330 filed Jan. 14, 2019. The related application is incorporated herein in its entirety by reference.

BACKGROUND

Various methods and apparatuses have been developed for removing carbon dioxide from the air. Although these methods have been shown to be efficient in removing carbon dioxide, they often result in disadvantages such as the air often having to be at a fairly high pressure. Accordingly, what is needed in the art is a device that can efficiently remove carbon dioxide from air.

BRIEF SUMMARY

Disclosed herein is an electrochemical carbon dioxide recovery system and a method for recovering carbon dioxide.

In an embodiment, a method for recovering carbon dioxide comprises introducing a carbon dioxide rich stream to a scrubber comprising a metal hydroxide and allowing the carbon dioxide to react with the metal hydroxide to form a metal carbonate; directing a metal carbonate stream from the scrubber to an electrochemical concentrator and applying a potential to the electrochemical concentrator to form a metal hydroxide stream and a separated carbon dioxide stream; directing the metal hydroxide stream comprising a recovered metal hydroxide and hydrogen to an electrochemical separator and applying a potential to the electrochemical separator to separate the hydrogen forming a hydrogen recycle stream from the recovered metal hydroxide forming a metal hydroxide recycle stream; and directing the separated carbon dioxide stream to a gas liquid separator and separating the separated carbon dioxide stream into a recycled water stream and a concentrated carbon dioxide stream.

In another embodiment, an electrochemical carbon dioxide collection system comprises a scrubber comprising a metal hydroxide capable of reacting carbon dioxide in a carbon dioxide rich stream to form a metal carbonate stream comprising a metal carbonate; an electrochemical concentrator in fluid communication with the scrubber via the metal carbonate stream, wherein the electrochemical concentrator is capable of separating the metal carbonate into carbon dioxide and the metal hydroxide; an electrochemical separator in fluid communication with the electrochemical concentrator via a metal hydroxide stream comprising the metal hydroxide, wherein the electrochemical separator is capable of separating the metal hydroxide forming a metal hydroxide recycle stream from hydrogen forming a hydrogen recycle stream; and a gas liquid separator in fluid communication with the electrochemical concentrator via a separated carbon dioxide stream, wherein the gas liquid separator is capable of separating carbon dioxide forming a concentrated carbon dioxide stream from water forming a recycled water stream, wherein the recycled water stream is in fluid communication with the electrochemical concentrator.

The above described and other features are exemplified by the following figures, detailed description, and claims.

BRIEF DESCRIPTION OF THE DRAWINGS

The figures are exemplary embodiments, wherein the like elements are numbered alike.

DETAILED DESCRIPTION

The present disclosure relates to a system for removing carbon dioxide from a gas to form a concentrated carbon dioxide stream. The system utilizes a metal hydroxide scrubbing fluid to remove the carbon dioxide from air by forming a metal carbonate and two electrochemical cells to regenerate the carbon dioxide and to form a regenerated metal hydroxide for recycling back for use as the scrubbing fluid. The system for removing carbon dioxide from a gas can produce a compressed carbon dioxide having a pressure of as much as 7.38 megapascals.

Figure 1:
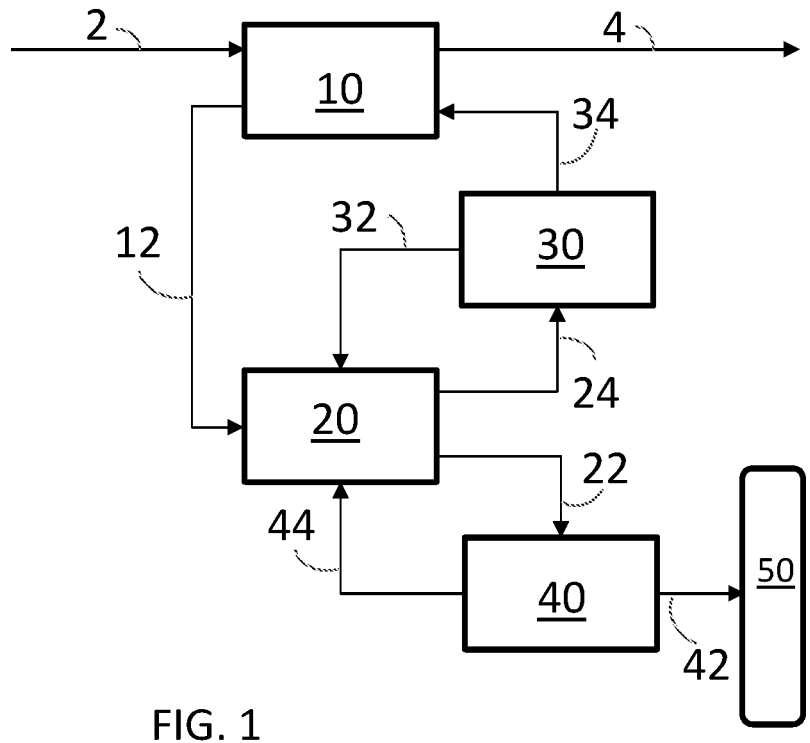
FIG. 1 is an illustrative aspect of the electrochemical carbon dioxide collection system.

The carbon dioxide collection system is illustrated in FIG. 1. FIG. 1 illustrates that a carbon dioxide rich stream 2 can be directed to a scrubber 10. The carbon dioxide rich stream 2 can comprise atmospheric air or a carbon dioxide off-gas stream. The carbon dioxide rich stream 2 can comprise 1 to 95 volume percent of carbon dioxide based on the total volume of the stream. The scrubber 10 can comprise a metal hydroxide. The metal hydroxide can comprise at least one of sodium hydroxide, lithium hydroxide, potassium hydroxide, or cesium hydroxide. The carbon dioxide reacts with the metal hydroxide to form a metal carbonate. The metal carbonate can exit the scrubber 10 via metal carbonate stream 12 and the scrubbed air can be removed from the scrubber 10 via a carbon dioxide poor stream 4. The carbon dioxide poor stream 4 can comprise less than 1 volume percent, or less than or equal to 0.1 volume percent of carbon dioxide based on the total volume of the stream.

Figure 2:
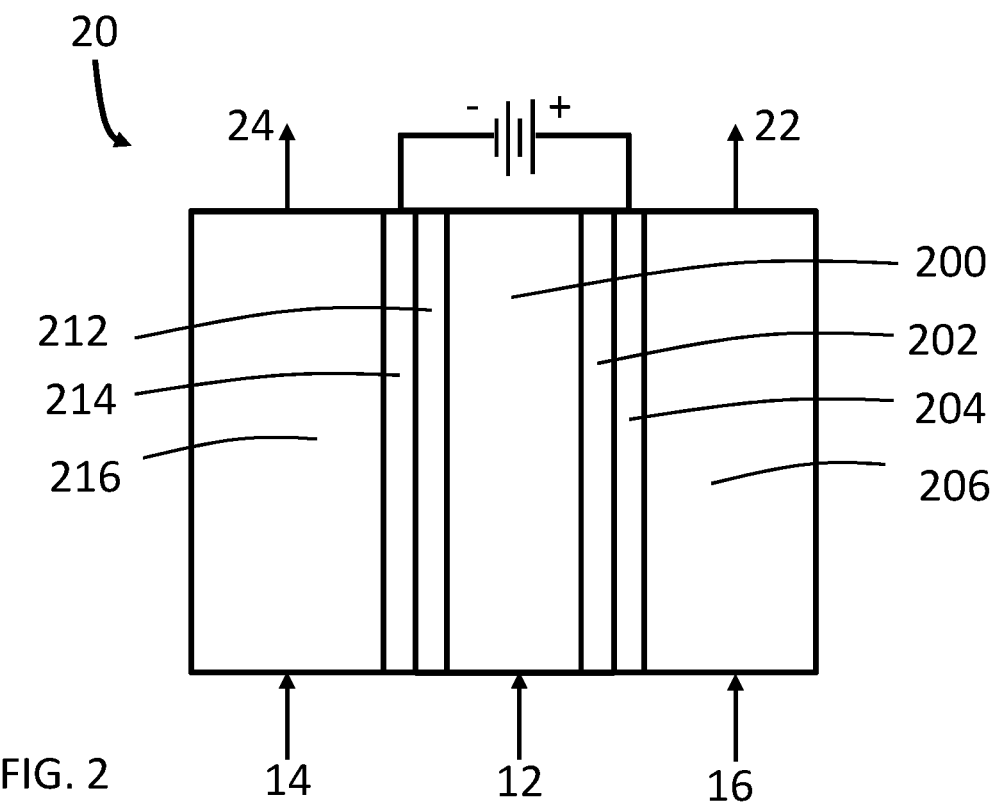
FIG. 2 is an illustrative aspect of the electrochemical concentrator.

The metal carbonate stream 12 can be in fluid communication with an electrochemical concentrator 20. As shown in FIG. 2, the electrochemical concentrator 20 has an anion permeable membrane 202 with an inner face and an outer face and a cation permeable membrane 212 with an inner face and an outer face. The inner faces of the anion permeable membrane 202 and the cation permeable membrane 212 define a fluid feed compartment 200, into which the metal carbonate stream 12 is fed. The fluid feed compartment 200 can be filled with a spacer that can support the membranes and maintain the shape of the fluid feed compartment 200. The spacer can be porous to permit the carbonate salt solution from the metal carbonate stream 12 to flow freely through the fluid feed compartment 200. The spacer can be made from a material chemically inert to the carbonate salt solution in the fluid feed compartment 200. The chemically-inert material can comprise at least one of a fluoropolymer (for example, polytetrafluoroethylene), a ceramic, or a metal (for example, stainless steel, niobium, tantalum, titanium, or zirconium). For example, the spacer can be a screen package comprising niobium metal. The spacer can optionally be electrically conductive.

The anion permeable membrane 202 and the cation permeable membrane 212 are semi-permeable membranes that can function as solid polymer electrolytes. The anion permeable membrane 202 can be selectively permeable to carbonate anions. The anion permeable membrane 202 can be formed from any material that will permit carbonate anions to diffuse through, while excluding metal cations. For example, the anion permeable membrane 202 can comprise at least one of a polyolefin, tetrafluoroethylene (TFE), fluorinated ethylenepropylene/TFE (FEP/TFE), polystyrene divinylbenzene (PS-DVB) on nylon, PS-DVB on polytetrafluoroethylene (PTFE), or PS-DVB on polyvinyl chloride. Suitable membranes are available from Ionics Incorporated (Watertown, Mass.), particularly their AR-204 and AR-708 membranes; Pall RAI, Inc. (Happauge, N.Y.), particularly their R1030 and R4030 membranes; Tokuyama Soda (Tokyo, Japan), particularly their AMH membrane; Asahi Glass America, Inc. (New York, N.Y.), particularly their AAV and AMP membranes; and Tosoh Corporation (Tokyo, Japan), particularly their Tosflex membrane. The anion permeable membrane 202 can have a membrane thickness of 25 to 550 micrometers or 75 to 550 micrometers.

The cation permeable membrane 212 can be selectively permeable to metal cations and can also be permeable to water. For example, the cation permeable membrane 212 can permit about 3.5 moles of water per mole of cation to diffuse there through. The cation permeable membrane 212 can be formed from any material that will permit metal cations and water to diffuse through, while excluding carbonate anions. For example, the cation permeable membrane 212 can comprise a perfluorosulfonic acid polymer, for example, Nafion™ that is commercially available from E. I. DuPont de Nemours (Wilmington, Del.). The cation permeable membrane 212 can have a membrane thickness of 25 to 550 micrometers, or 75 to 550 micrometers, or 100 to 300 micrometers.

An anode 204 is located on the outer face of the anion permeable membrane 202. The anode 204 comprises a catalyst capable of oxidizing hydrogen. A cathode 214 is located on the outer face of the cation permeable membrane 212. The cathode 214 comprises catalyst capable of reducing water to hydroxyl ions and hydrogen. The anion catalyst and the cathode catalyst can each independently comprise at least one of aluminum, nickel, platinum, or a platinum alloy. For example, at least one of the catalysts can comprise a RANEY' nickel catalyst. The anion catalyst and the cathode catalyst can each independently comprise platinum black. The catalyst loading on the respective membranes can be 1 to 10 milligrams per centimeters squared ($mg/cm^2$), or 4 to 6 $mg/cm^2$, 5 to 7 $mg/cm^2$.

The anode 204 and the cathode 214 can each independently comprise the catalyst and a binder (for example, a fluoropolymer such as polytetrafluoroethylene). For example, the respective catalyst can be present an amount of 5 to 30 weight percent (wt %), or 10 to 20 wt % of the binder based on the total weight of the respective anode 204 or cathode 214.

A carbon dioxide collection compartment 206 can be located adjacent to the anode 204 on the side opposite from the fluid feed compartment 200. Hydrogen can be fed into carbon dioxide collection compartment 206 via hydrogen stream 16. The hydrogen pressure in the carbon dioxide collection compartment 206 can be monitored via a pressure controller that controls, for example, a valve or a back pressure regulated located on a conduit of the hydrogen stream 16. The carbon dioxide collection compartment 206 can be filled with a conductive spacer that can support the anion permeable membrane 202 and can allow for passage of electrons to an external circuit. The conductive spacer can be porous to permit hydrogen and carbon dioxide to flow freely through the carbon dioxide collection compartment 206. The conductive spacer can be constructed from a conductive, chemically-inert material that resists hydrogen embrittlement, and can be in any appropriate configuration, for example, a screen package. The conductive spacer can comprise at least one of stainless steel, tantalum, gold, platinum, or titanium. The conductive spacer can be plated with a metal such as platinum to improve conductivity and to reduce contact resistance.

A scrubbing fluid collection compartment 216 is located adjacent to the cathode 214 on the side opposite from the fluid feed compartment 200. Water can be fed to the scrubbing fluid collection compartment 216 via water stream 14. The scrubbing fluid collection compartment 216 can comprise a scrubbing compartment spacer that can support the cation permeable membrane 212 and can provide electrons to the electrochemical reaction. The scrubbing compartment spacer can be porous to permit water and regenerated metal hydroxide scrubbing fluid to flow freely through the scrubbing fluid collection compartment 216. The scrubbing compartment spacer can comprise a conductive, chemically-inert material and can be in any appropriate configuration, for example, a screen package. The scrubbing compartment spacer can comprise a material compatible with the respective working fluid. The scrubbing compartment spacer can comprise at least one of stainless steel, tantalum, gold, platinum, or titanium. The scrubbing compartment spacer can be plated with platinum to improve conductivity and to reduce contact resistance.

To initiate the separation, the carbonate salt solution is fed to the fluid feed compartment 200. The carbonate salt solution can be saturated to minimize the voltage needed to run the separation. Hydrogen is supplied to the anode 204 via hydrogen stream 16, water is supplied to the cathode 214 via the water stream 14, and a potential is applied across the electrodes. Hydrogen is oxidized at the anode 204 according to the following reaction:

$$H_2 \rightarrow 2H^+ + 2e^- \qquad (1)$$

while water is reduced at the cathode 214 according to the following reaction:

$$2H_2O + 2e^- \rightarrow 2OH^- + H_2 \qquad (2)$$

Meanwhile, carbonate and metal ions migrate across the anion permeable membrane 202 and the cation permeable membrane, 212 respectively, due to the voltage driving force across the membranes. The concentration gradients are maintained by continuously reacting the carbonate and metal ions at the anode 204 and the cathode 214, respectively, and removing the reaction by-products.

At the anode 204, carbonate ions undergo the following reaction to produce carbon dioxide:

$$CO_3^{-2} + 2H^+ \rightarrow CO_2 + H_2O \qquad (3)$$

At the cathode 214, metal ions, for example, potassium combine with hydroxyl ions to produce potassium hydroxide:

$$K^+ + OH^- \rightarrow KOH \qquad (4)$$

These reactions primarily occur at the catalyst/fluid interface, although some reaction can also occur on the surfaces of the conductive spacers located in the carbon dioxide collection compartment 206 and scrubbing fluid collection compartment 216. The metal hydroxide, water, and hydrogen are removed from the scrubbing fluid collection compartment 216. Water and any metal carbonate that is not removed from the feed flow through the fluid feed compartment 200 can be removed from the fluid feed compartment via a conduit, not shown.

The carbon dioxide produced at the anode 204 can be collected in the carbon dioxide collection compartment 206 and can be removed via the separated carbon dioxide stream 22. A conduit of the separated carbon dioxide stream 22 can include a pressure regulator to supply carbon dioxide at a desired pressure. Carbon dioxide can be supplied at pressures of greater than or equal to 6 megapascals. The pressure in the carbon dioxide collection compartment 206 can be atmospheric pressure to 6 megapascals or more depending on the design of the electrochemical concentrator 20. In order to obtain increased pressures, the electrochemical concentrator 20 can comprise endplates that define outer walls. The endplates can comprise stainless steel or another chemically-inert structural material of sufficient strength to maintain cell stack preload at the operating pressure of the electrochemical concentrator 20.

As illustrated in FIG. 1, metal hydroxide stream 24 can exit the scrubbing fluid collection compartment 216 and can be in fluid communication with an electrochemical separator 30. The electrochemical separator 30 can separate the metal hydroxide from the hydrogen to form hydrogen recycle stream 32 and metal hydroxide recycle stream 34. Hydrogen recycle stream 32 can be in fluid communication with the electrochemical concentrator 20 via hydrogen stream 16. For example, hydrogen stream 16 can be the hydrogen recycle stream 32, or the hydrogen stream 16 can comprise a fresh hydrogen and the hydrogen recycle stream 32. The metal hydroxide recycle stream 34 can be in fluid communication with the scrubber 10.

Figure 3:
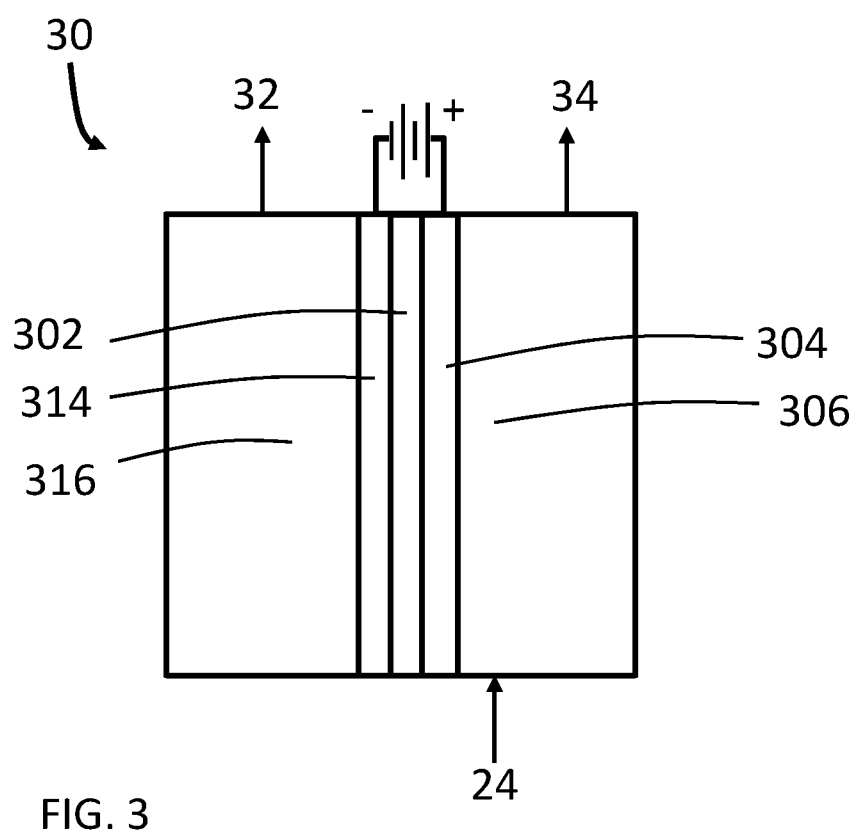
FIG. 3 is an illustrative aspect of the electrochemical separator.

The metal hydroxide stream 24 can be in fluid communication with the electrochemical separator 30 as illustrated in FIG. 3. The metal hydroxide stream 24 and an optional water stream, not illustrated, can be directed to a metal hydroxide purification chamber 306. To initiate the separation of the hydrogen from the metal hydroxide, a potential can be applied across the hydrogen separator anode 304 and hydrogen separator cathode 314. Hydrogen in the metal hydroxide purification chamber 306 in contact with the hydrogen separator anode 304 can be split into protons and electrons by the electrochemical reaction according to reaction (1). The protons formed from the reaction (1) can be driven across the proton exchange membrane 302 due to the polarity of the voltage applied and the electrons formed from reaction (1) can be bussed through an external circuit. Each proton transported through the proton exchange membrane can drag an amount of water along with it, where it is believed that between 2 and 4 moles, or 2.5 to 3.5 moles of water can be transported across the membrane for every mole of protons that passes through the proton exchange membrane 302. The protons driven through the proton exchange membrane 302 can then be combined at the hydrogen separator cathode 314 with the electrons being bussed from the external circuit by the electrochemical reaction (3).

$$2H^+ + 2e^- \rightarrow H_2 \quad (3)$$

Each electrode of the electrochemical separator 30 independently can comprise a catalyst layer. The catalyst layer can comprise at least one of platinum, palladium, rhodium, carbon, gold, tantalum, tungsten, ruthenium, iridium, osmium, or silver. The catalyst can comprise a bound catalyst. The binder can comprise at least one of a fluoropolymer or a particulate carbon. The catalyst and optional binder can be deposited directly onto the surfaces of the proton exchange membrane. The catalyst can be located on a gas diffusion layer such that it is located throughout the gas diffusion layer or on a surface of the gas diffusion layer that is in contact with the proton exchange membrane. The gas diffusion layer can be a spacer that can provide structural integrity to the membrane electrode assembly. The gas diffusion layer can be porous. The gas diffusion layer can be a mesh. The gas diffusion layer can comprise a graphitic material. The gas diffusion layer can comprise a plurality of fibers such as carbon fibers. The gas diffusion layer can be electrically conductive.

The proton exchange membrane can comprise an electrolyte such as at least one of a proton conducting ionomer or an ion exchange resin. The proton conducting ionomer can comprise a polymer complexed with at least one of an alkali metal salt, an alkali earth metal salt, a protonic acid, or a protonic acid salt. The complexed polymer can comprise at least one of a polyether, polyester, polyimide, or a polyoxyalkylene (such as poly(ethylene glycol), poly(ethylene glycol monoether), or poly(ethylene glycol diether)).

The proton exchange membrane 302 can comprise the same or different material as the water selective membrane. For example, the proton exchange membrane 302 can comprise an ionomer-type polyelectrolyte comprising an amount of ionic groups on a hydrophobic backbone or on pendant groups off of the hydrophobic backbone such as a hydrocarbon- and fluorocarbon-type resin. The hydrocarbon-type ion-exchange resin can comprise at least one of a phenolic resin or a polystyrene. The hydrocarbon-type ion-exchange resin can be sulfonated, for example, a sulfonated poly(xylylene oxide). The hydrocarbon-type ion-exchange resin can comprise a proton conducting molecule, for example, at least one of a fullerene molecule, a carbon fiber, or a carbon nanotube. The proton conducting molecules can comprise proton dissociation groups, for example, least one of $-OSO_3H$, $-OPO(OH)_2$, $-COOH$, $-SO_3H$, $-C_6H_4$, $-SO_3H$, or $-OH$. The proton conducting molecules alone can form the proton exchange membrane or can be present as a mixture with a binder polymer such as at least one of a fluoropolymer (for example, polyfluoroethylene or poly(vinylidene fluoride)) or poly(vinyl alcohol)). As oxygen is not present in a significant amount in the proton exchange membrane, the concern for oxidation is low, and the proton exchange membrane 302 can comprise a hydrocarbon-type ion-exchange resin.

The fluorocarbon-type ion-exchange resin can include a hydrate of at least one of tetrafluoroethylene-perfluorosulfonyl ethoxyvinyl ether or tetrafluoroethylene-hydroxylated (perfluoro vinyl ether) copolymer. The fluorocarbon-type ion-exchange resin can have at least one of a sulfonic, a carboxylic, or a phosphoric acid functionality. The fluorocarbon-type ion-exchange resin can be a sulfonated fluoropolymer (such as a lithium salt of perfluoroethylene sulfonic acid). An example of fluorocarbon-type ion-exchange resin is a perfluorosulfonic acid polymer, for example, NAFION™ that is commercially available from DuPont.

The electrochemical separator 30 can separate the hydrogen in the hydrogen collection chamber 316 and the metal hydroxide can be purified due to the removal of the hydrogen in the metal hydroxide purification chamber 306. The hydrogen recycle stream 32 can be withdrawn from the hydrogen collection chamber 316 and can be in fluid communication with the electrochemical concentrator 20. The metal hydroxide recycle stream 34 can be withdrawn from the metal hydroxide purification chamber 306 and can be in fluid communication with the scrubber 10.

FIG. 1 further illustrates that the separated carbon dioxide in the carbon dioxide collection compartment 206 can exit via separated carbon dioxide stream 22. Separated carbon dioxide stream 22 can comprise the reformed carbon dioxide, water, and hydrogen. If a hydrogen content of the separated carbon dioxide stream 22 is not in a desired range, then the separated carbon dioxide stream 22 can be in fluid communication with an electrochemical separator such as electrochemical separator 20 before or after the gas liquid separator 40. The separated carbon dioxide stream 22 can be in fluid communication with a gas liquid separator 40. The gas liquid separator 40 can separate the water from the carbon dioxide, forming a recycled water stream 44 and concentrated carbon dioxide stream 42. The gas liquid separator 40 can separate the carbon dioxide from the water by at least one of spraying the separated carbon dioxide stream 22, applying a vacuum pressure to the separated carbon dioxide stream 22, taking advantage of the buoyancy differences between carbon dioxide and water, inducing a cavitation event (for example, using a packed column separation method or applying ultrasonic vibrations), or increasing a temperature of the separated carbon dioxide stream 22. Recycled water stream 44 can be in fluid communication with the electrochemical concentrator 20 via water stream 14. For example, water stream 14 can be the recycled water stream 44, or the water stream 14 can comprise a fresh water and the recycled water stream 44. The concentrated carbon dioxide stream 42 can be in fluid communication with a compressed carbon dioxide storage tank 50.

The electrochemical concentrator 20 and the electrochemical separator 30 can comprise a power source to apply a voltage to the respective devices. The applied voltage can each independently be less than or equal to 1 volt (V), or less than or equal to 0.8 volts, less than or equal to 0.5 volts, or 0.01 to 0.2 volts. The power source can be a solar array, a direct current (DC) source, a windmill, a battery (for example, a flow battery), a fuel cell, etc.

The carbon dioxide production rate is a direct function of the number of cells stacked together and the DC current applied to the stack. For example, the system can comprise one or more electrochemical concentrators in serious or in parallel to result in increased production rates. Likewise the system can include one or more scrubbers, one or more electrochemical separators, or one or more gas liquid separators.

Set forth below are non-limiting aspects of the present disclosure.

Aspect 1: A method for recovering carbon dioxide comprising: introducing a carbon dioxide rich stream to a scrubber comprising a metal hydroxide and allowing the carbon dioxide to react with the metal hydroxide to form a metal carbonate; directing a metal carbonate stream from the scrubber to an electrochemical concentrator and applying a potential to the electrochemical concentrator to form a metal hydroxide stream and a separated carbon dioxide stream; directing the metal hydroxide stream comprising a recovered metal hydroxide and hydrogen to an electrochemical separator and applying a potential to the electrochemical separator to separate the hydrogen forming a hydrogen recycle stream from the recovered metal hydroxide forming a metal hydroxide recycle stream; and directing the separated carbon dioxide stream to a gas liquid separator and separating the separated carbon dioxide stream into a recycled water stream and a concentrated carbon dioxide stream.

Aspect 2: The method of Aspect 1, wherein the directing the metal carbonate stream to the electrochemical concentrator comprises directing the metal carbonate stream to a fluid feed compartment of the electrochemical separator; and wherein the forming the metal hydroxide stream and the separated carbon dioxide stream comprises separating carbonate ions through an anion permeable membrane adjacent to the fluid feed compartment and reacting the carbonate ions with hydrogen on an anode to form the carbon dioxide in a carbon dioxide collection chamber; and separating metal ions through a cation permeable membrane adjacent to the fluid feed compartment and reacting the metal ions with hydroxyl ions on a cathode to form the metal hydroxide in a scrubbing fluid collection chamber.

Aspect 3: The method of Aspect 2, further comprising removing the metal hydroxide stream from the scrubbing fluid collection chamber.

Aspect 4: The method of any one of Aspects 2 or 3, further comprising removing the separated carbon dioxide stream from the carbon dioxide collection chamber.

Aspect 5: The method of any one of the preceding aspects, wherein the directing the metal hydroxide stream to the electrochemical separator comprises directing the metal hydroxide stream to a metal hydroxide purification chamber of the electrochemical separator; and wherein the separating the hydrogen from the recovered metal hydroxide comprises separating hydrogen atoms on a hydrogen separation anode adjacent to the metal hydroxide purification chamber, directing hydrogen ions through a proton exchange membrane, reforming hydrogen on a hydrogen separation cathode, and collecting the hydrogen in a hydrogen collection chamber; wherein the hydrogen recycle stream is in fluid communication with the hydrogen separation chamber and the metal hydroxide stream is in fluid communication with the metal hydroxide purification chamber.

Aspect 6: The method of any one of the preceding aspects, further comprising directing the hydrogen recycle stream to the electrochemical concentrator.

Aspect 7: The method of any one of the preceding aspects, further comprising directing the recycled water stream to the electrochemical concentrator.

Aspect 8: The method of any one of the preceding aspects, further comprising directing the metal hydroxide recycle stream to the scrubber.

Aspect 9: An electrochemical carbon dioxide collection system comprising: a scrubber comprising a metal hydroxide capable of reacting carbon dioxide in a carbon dioxide rich stream to form a metal carbonate stream comprising a metal carbonate; an electrochemical concentrator in fluid communication with the scrubber via the metal carbonate stream, wherein the electrochemical concentrator is capable of separating the metal carbonate into carbon dioxide and the metal hydroxide; an electrochemical separator in fluid communication with the electrochemical concentrator via a metal hydroxide stream comprising the metal hydroxide, wherein the electrochemical separator is capable of separating the metal hydroxide forming a metal hydroxide recycle stream from hydrogen forming a hydrogen recycle stream; and a gas liquid separator in fluid communication with the electrochemical concentrator via a separated carbon dioxide stream, wherein the gas liquid separator is capable of separating carbon dioxide forming a concentrated carbon dioxide stream from water forming a recycled water stream, wherein the recycled water stream is in fluid communication with the electrochemical concentrator. The electrochemical carbon dioxide collection system can be used in any of the preceding aspects.

Aspect 10: The system of Aspect 9, wherein the electrochemical concentrator comprises a fluid feed compartment in fluid communication with the scrubber via the metal carbonate stream; wherein the electrochemical concentrator comprises an anion permeable membrane adjacent to the fluid feed compartment that is capable of transporting carbonate ions and an anode that is capable reacting the carbonate ions with hydrogen to form carbon dioxide and water in a carbon dioxide collection chamber; and wherein the electrochemical concentrator comprises a cation permeable membrane adjacent to the fluid feed compartment that is capable of transporting metal ions and a cathode that is capable of reacting the metal ions with water to form the metal hydroxide and hydrogen in a scrubbing fluid collection chamber.

Aspect 11: The system of Aspect 10, wherein the scrubbing fluid collection chamber is in fluid communication with the electrochemical separator via the metal hydroxide stream.

Aspect 12: The system of any one of Aspects 10 or 11, wherein the carbon dioxide collection chamber is in fluid communication with the gas liquid separator via separated carbon dioxide stream.

Aspect 13: The system of any one of Aspects 9 to 12, wherein the electrochemical separator comprises a metal hydroxide purification chamber in fluid communication with the electrochemical concentrator via the metal hydroxide stream; wherein the electrochemical separator comprises a hydrogen separation anode adjacent to the metal hydroxide purification chamber that is capable of separating the hydrogen from the metal hydroxide, a proton exchange membrane that is capable of directing hydrogen ions from the hydrogen separation anode to a hydrogen separation cathode; wherein the hydrogen separation cathode is capable of reforming hydrogen, wherein the electrochemical separator further comprises a hydrogen collection chamber to collect hydrogen from the hydrogen separation cathode.

Aspect 14: The system of any one of Aspects 9 to 13, wherein the hydrogen recycle stream is in fluid communication with the electrochemical concentrator.

Aspect 15: The system of any one of Aspects 9 to 14, wherein the recycled water stream is in fluid communication with the electrochemical concentrator.

Aspect 16: The system of any one of Aspects 9 to 15, wherein the metal hydroxide recycle stream is in fluid communication with the scrubber.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

The endpoints of all ranges directed to the same component or property are inclusive of the endpoints, are independently combinable, and include all intermediate points and ranges. For example, ranges of "up to 25 vol %, or 5 to 20 vol %" is inclusive of the endpoints and all intermediate values of the ranges of "5 to 25 vol %," such as 10 to 23 vol %, etc.). The term "combination" is inclusive of blends, mixtures, alloys, reaction products, and the like. Also, "at least one of the foregoing" means that the list is inclusive of each element individually, as well as combinations of two or more elements of the list, and combinations of at least one element of the list with like elements not named.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for recovering carbon dioxide comprising:
   introducing a carbon dioxide rich stream to a scrubber comprising a metal hydroxide and allowing the carbon dioxide to react with the metal hydroxide to form a metal carbonate;
   directing a metal carbonate stream from the scrubber to an electrochemical concentrator and applying a potential to the electrochemical concentrator to form a metal hydroxide stream and a separated carbon dioxide stream;
   directing the metal hydroxide stream comprising a recovered metal hydroxide and hydrogen to a metal hydroxide purification chamber of an electrochemical separator separating the hydrogen from the metal hydroxide stream to form a metal hydroxide recycle stream; wherein the separating comprises separating the hydrogen atoms on a hydrogen separation anode adjacent to the metal hydroxide purification chamber, directing hydrogen ions through a proton exchange membrane, reforming hydrogen on a hydrogen separation cathode, and collecting the hydrogen in a hydrogen collection chamber; wherein the hydrogen recycle stream is in fluid communication with the hydrogen collection chamber and the metal hydroxide stream is in fluid communication with the metal hydroxide purification chamber; and
   directing the separated carbon dioxide stream to a gas liquid separator and separating the separated carbon dioxide stream into a recycled water stream and a concentrated carbon dioxide stream.

2. The method of claim 1, wherein the directing the metal carbonate stream to the electrochemical concentrator comprises directing the metal carbonate stream to a fluid feed compartment of the electrochemical separator; and
   wherein the forming the metal hydroxide stream and the separated carbon dioxide stream comprises separating carbonate ions through an anion permeable membrane adjacent to the fluid feed compartment and reacting the carbonate ions with hydrogen on an anode to form the carbon dioxide in a carbon dioxide collection chamber; and separating metal ions through a cation permeable membrane adjacent to the fluid feed compartment and reacting the metal ions with hydroxyl ions on a cathode to form the metal hydroxide in a scrubbing fluid collection chamber.

3. The method of claim 2, further comprising removing the metal hydroxide stream from the scrubbing fluid collection chamber.

4. The method of claim 2, further comprising removing the separated carbon dioxide stream from the carbon dioxide collection chamber.

5. The method of claim 1, further comprising directing the hydrogen recycle stream to the electrochemical concentrator.

6. The method of claim 1, further comprising directing the recycled water stream to the electrochemical concentrator.

7. The method of claim 1, further comprising directing the metal hydroxide recycle stream to the scrubber.

8. An electrochemical carbon dioxide collection system comprising:
   a scrubber comprising a metal hydroxide capable of reacting carbon dioxide in a carbon dioxide rich stream to form a metal carbonate stream comprising a metal carbonate;
   an electrochemical concentrator in fluid communication with the scrubber via the metal carbonate stream, wherein the electrochemical concentrator is capable of separating the metal carbonate into carbon dioxide and the metal hydroxide;
   an electrochemical separator in fluid communication with the electrochemical concentrator via a metal hydroxide stream comprising the metal hydroxide, wherein the electrochemical separator is capable of separating the metal hydroxide forming a metal hydroxide recycle stream from hydrogen forming a hydrogen recycle stream; wherein the electrochemical separator comprises a metal hydroxide purification chamber in fluid communication with the electrochemical concentrator via the metal hydroxide stream;
   wherein the electrochemical separator comprises a hydrogen separation anode adjacent to the metal hydroxide purification chamber that is capable of separating the hydrogen from the metal hydroxide, a proton exchange membrane that is capable of directing hydrogen ions from the hydrogen separation anode to a hydrogen separation cathode; wherein the hydrogen separation cathode is capable of reforming hydrogen,
   wherein the electrochemical separator further comprises a hydrogen collection chamber to collect hydrogen from the hydrogen separation cathode; and
   a gas liquid separator in fluid communication with the electrochemical concentrator via a separated carbon dioxide stream, wherein the gas liquid separator is capable of separating carbon dioxide forming a concentrated carbon dioxide stream from water forming a recycled water stream, wherein the recycled water stream is in fluid communication with the electrochemical concentrator.

9. The system of claim 8, wherein the electrochemical concentrator comprises a fluid feed compartment in fluid communication with the scrubber via the metal carbonate stream;
   wherein the electrochemical concentrator comprises an anion permeable membrane adjacent to the fluid feed compartment that is capable of transporting carbonate ions and an anode that is capable reacting the carbonate ions with hydrogen to form carbon dioxide and water in a carbon dioxide collection chamber; and
   wherein the electrochemical concentrator comprises a cation permeable membrane adjacent to the fluid feed compartment that is capable of transporting metal ions and a cathode that is capable of reacting the metal ions with water to form the metal hydroxide and hydrogen in a scrubbing fluid collection chamber.

10. The system of claim 9, wherein the scrubbing fluid collection chamber is in fluid communication with the electrochemical separator via the metal hydroxide stream.

11. The system of claim 9, wherein the carbon dioxide collection chamber is in fluid communication with the gas liquid separator via separated carbon dioxide stream.

12. The system of claim 8, wherein the hydrogen recycle stream is in fluid communication with the electrochemical concentrator.

13. The system of claim 8, wherein the recycled water stream is in fluid communication with the electrochemical concentrator.

14. The system of claim 8, wherein the metal hydroxide recycle stream is in fluid communication with the scrubber.

\* \* \* \* \*